United States Patent [19]

Wootton et al.

[11] Patent Number: 4,576,640
[45] Date of Patent: Mar. 18, 1986

[54] HYDROGEN STORAGE MATERIAL

[75] Inventors: Malcolm J. Wootton; Ivor R. Harris, both of Birmingham, England

[73] Assignee: Lucas Industries Public Limited Company, Birmingham, England

[21] Appl. No.: 626,235

[22] Filed: Jun. 29, 1984

[30] Foreign Application Priority Data

Jul. 2, 1983 [GB] United Kingdom ............... 8318009

[51] Int. Cl.$^4$ .......................................... C22C 38/00
[52] U.S. Cl. ................................. 75/123 E; 420/416; 420/900; 423/644
[58] Field of Search ............. 75/123 E; 420/416, 900; 423/644, 648 R

[56] References Cited

FOREIGN PATENT DOCUMENTS 6495  1/1980  Japan .............................. 75/123 E
1554384 10/1979  United Kingdom .

OTHER PUBLICATIONS

Van Mal H. H. et al. "Hydrogen Absorption of Rare Earth (3d) Transition Intermetallic Compounds" J. Less Comm. Metals 49(1976) pp. 473–475.
Ray A. E. "Iron-Rare Earth Intermediate Phases" Proc. Rare Earth Res. Conf. 1968 CA 41399d.

Primary Examiner—Christopher W. Brody

[57] ABSTRACT

A hydrogen storage material for releasably storing hydrogen having a microstructure containing an alloy phase of the general formula $R_2Fe_{17}$, wherein R is cerium and lanthanum and, optionally, at least one other rare earth element, and wherein a microstructure also contains from about 2 to 35% by weight, based on the total weight of all phases, of a eutectic of the formula $R'/R'Fe_2$, wherein $R'$ is lanthanum-starved R; the alloy phase of the general formula $R_2Fe_{17}$ being present in an amount of not less than 40% by weight of the material, and the material contains less than 60% by weight of cerium based on the total amount of cerium, lanthanum and, if present, at least one other rare earth element. A method for producing such material by heat treating in an inert atmosphere so as to homogenize same and to increase the proportion of alloy phase in the material is also described.

19 Claims, 4 Drawing Figures

| | Ce | | Pr | | Nd | |
|---|---|---|---|---|---|---|
| | °C | at % | °C | at % | °C | at % |
| a | 795 | - | 917 | - | 1050 | - |
| b | 715 | - | 790 | - | 860 | - |
| c | 592 | - | ~660 | - | 640 | - |
| d | 397 | - | - | - | - | - |
| e | 715 | ~93 | 790 | ~91 | 860 | ~86 |
| f | 592 | 83 | ~660 | 80-85 | 640 | ~75 |
| g | 932 | ~53 | 870 | 30-35 | 1130 | ~47 |
| h | 1068 | ~38 | 1108 | 45 | 1185 | ~39 |
| j | 1400 | ~13 | 1400 | ~14 | 1400 | ~17 |
| k | 1068 | - | 1108 | - | 1185 | - |
| l | 911 | - | 930 | - | 935 | - |
| m | 1068 | ~11 | 1108 | ~11 | 1185 | ~11 |
| n | 932 | - | 670 | - | 1130 | - |
| p | 932 | ~34 | 670 | ~33 | 1130 | ~33 |

| | Ce | | Pr | | Nd | |
|---|---|---|---|---|---|---|
| | °C | at % | °C | at % | °C | at % |
| a | 795 | - | 917 | - | 1050 | - |
| b | 715 | - | 790 | - | 860 | - |
| c | 592 | - | ~660 | - | 640 | - |
| d | 397 | - | - | - | - | - |
| e | 715 | ~93 | 790 | ~91 | 860 | ~86 |
| f | 592 | 83 | ~660 | 80-85 | 640 | ~75 |
| g | 932 | ~53 | 670 | 80-85 | 1130 | ~47 |
| h | 1068 | ~38 | 1108 | 45 | 1185 | ~39 |
| j | 1400 | ~13 | 1400 | ~14 | 1400 | ~17 |
| k | 1068 | - | 1108 | - | 1185 | - |
| l | 911 | - | 930 | - | 935 | - |
| m | 1068 | ~11 | 1108 | ~11 | 1185 | ~11 |
| n | 932 | - | 670 | - | 1130 | - |
| p | 932 | ~34 | 670 | ~33 | 1130 | ~33 |

HYDROGEN STORAGE MATERIAL

For economically storing relatively large quantities of hydrogen, a hydrogen storage material comprises (1) a major $R_2Fe_{17}$ phase present in the material in an amount of not less than 40% by weight wherein R is lanthanum, cerium and, optionally, other rare earth(s) such as praesodymium and neodymium, (2) and R'/R'Fe$_2$ eutectic where R' is lanthanum-starved R, (3) an unalloyed lanthanum phase, and (4) an unalloyed iron phase. The material contains less than 60% by weight cerium based on the total weight of cerium, lanthanum and other rare earth(s). Such a material is produced by an homogenising heat treatment.

This invention relates to hydrogen storage and is more particularly concerned with a material for releasably storing hydrogen in hydride form and to a method of increasing the hydrogen storage capacity of a material. Such a material is useful for engines designed to use hydrogen as a fuel, for supplying very high purity hydrogen or for other energy receiving or transforming systems, e.g. fuel cells.

Many types of materials are known for releasably storing hydrogen in hydride form. Magnesium, being of low density and possessing a high hydrogen capacity per unit of mass (of the order of 7 wt %) is particularly advantageous. However, the reaction of hydrogen with magnesium to form the hydride ($MgH_2$) takes place at relatively high temperatures and pressures. The magnesium-hydrogen system has very slow absorption-desorption kinetics and the dissociation temperature of magnesium hydride to give an adequate hydrogen desorption rate is impractically high for vehicular applications. Attempts to overcome these problems using magnesium alloys have met with little success.

The TiFe—TiFeH based system has been investigated in view of its relatively good hydrogen storage capacity of about 1.5% by weight but has the disadvantage of being heavy and fairly expensive although it does have a lower dissociation temperature than magnesium hydride.

The LaNi$_5$-LaNi$_5$ H$_x$ system and variants thereof have also been studied but are heavy and expensive.

GB No. 1554384, which is concerned with the manufacture of rare earth metal alloy magnet powders, uses cominution techniques involving conversion of the alloy to the hydride by hydrogen absorption and subsequent desorption of the hydrogen which reduces the alloy to powder by so-called hydride "decrepitation". Of a number of magnetic alloys disclosed in GB No. 1554384, there is an alloy comprising a phase of the formula $A_xB_y$, wherein one element of A represents at least one transition metal, B represents at least one rare earth metal, cerium or yttrium and x and y approximate to at least one of the following pairs of integers 2:1, 5:1, 7:2 and 17:2. For permanent magnets (having a high Curie Temperature), it is most preferred for A to comprise cobalt and/or iron and for B to comprise samarium or praesodymium or cerium-enriched mischmetal. However, there is no suggestion in GB No. 1554384 that such material can be used in practice for the releasable storage of hydrogen. On the contrary, GB No. 1554384 uses magnesium hydride for storage of hydrogen. The rare-earth materials disclosed in GB No. 1554384 have been chosen for their magnetic properties and for the fact that they can be reduced in size by absorption and desorption of hydrogen.

The inventors have found that a very promising material for releasably storing hydrogen in hydride form can be obtained from materials containing, an alloy phase of the generalised formula $R_2Fe_{17}$, wherein R is lanthanum and cerium, optionally at least one other rare earth element.

According to one aspect of the present invention, there is provided a material for releasably storing hydrogen in hydride form, having a microstructure comprising an alloy phase of the generalised formula $R_2Fe_{17}$, wherein R comprises cerium and lanthanum and, optionally, at least one other rare earth element, and wherein the microstructure also contains a eutectic of the formula R'/R'Fe$_2$, wherein R' is lanthanum-starved R; wherein said alloy phase of the generalised formula $R_2Fe_{17}$ is present in an amount of not less than 40% by weight of the material and said material contains less than 60% by weight of cerium based on the total amount of cerium, lanthanum and, if present, said at least one other rare earth element.

Although the alloy phase has a structure which is consistent with that of an alloy of the general formula $R_2Fe_{17}$, analysis of the alloy by energy dispersive X-ray analysis indicates that it is usually Fe deficient i.e. certain Fe atoms in the alloy lattice are missing but the $R_2Fe_{17}$ structure is retained. The chemical formula of the alloy may be represented by $R_2 Fe_x$, x being from 12 to 17. The generalised formula $R_2Fe_{17}$ will be used henceforth to indicate materials which have a formula of $R_2Fe_x$ wherein x is from 12 to 17 and an $R_2Fe_{17}$ structure. Normally, x is about 14 in the alloys of the present invention.

R' will normally contain no lanthanum but may contain a small amount (e.g. 1–3 atomic %).

The presence of a eutectic of the formula R'/R'Fe$_2$ is necessary to enable rapid absorption of hydrogen. This readily activates the material for eventual hydrogen absorption by the alloy phase at higher pressures, the alloy phase serving the function of providing bulk hydrogen storage and having good hydrogen storage capacity. Preferably, the eutectic is present in an amount of not more than 20% by weight, more preferably not more than 15% by weight, and most preferably about 5% by weight, based on the total weight of all phases. A small amount of lanthanum may be dissolved in the R'Fe$_2$ part of the R'/R'Fe$_2$ eutectic phase.

Praesodymium and/or neodymium are preferably included as said at least one other rare earth element. Said at least one other rare earth element (preferably neodymium) may be present in the material in an atomic percentage which is equal to or less than the atomic percentage of lanthanum therein. Preferably the weight ratio of lanthanum to cerium in the material is at least 0.4:1, preferably at least 1:1. Preferably also, when said at least one other rare earth element is present, the combined amount of cerium and lanthanum in the material is greater than 50% by weight of the total amount of cerium, lanthanum and at least one other rare earth element.

The cerium content of the total amount of cerium, lanthanum and, if present, said other rare earth element(s) in the material is preferably less than 50% by weight, and is usually present in an amount of at least 30% by weight.

Most preferably, the storage material of the invention is mischmetal based i.e. mischmetal is used as one of the starting materials for the preparation of the storage material of the invention.

The material may contain 0.1–25% of weight (preferably 5 to 10% by weight, most preferably about 5% by weight) lanthanum as an unalloyed lanthanum phase.

The unalloyed lanthanum phase is present in association with the R'/R'Fe$_2$ phase as a layer at the grain boundaries of the R$_2$Fe$_{17}$ alloy phase. The lanthanum at the grain boundary assists in limited oxidation-induced decrepitation of the material if required, to produce cracks in the material. The cracks in this material allow more surface area to be available for absorption and desorption of hydrogen.

R in the generalised formula R$_2$Fe$_{17}$ most preferably consists essentially of La$_a$ Ce$_b$ Pr$_c$ Nd$_d$, where a+b+c+d=1.0. a is preferably 0.1 to 0.3. b is preferably 0.05 to 0.6. c is preferably 0.02 to 0.2. d is preferably 0.02 to 0.65.

A typical R$_2$Fe$_{17}$ phase has the following composition:

La: 4.66 wt %
Ce: 11.11 wt %
Nd: 10.23 wt %
Fe: 74. 0 wt %

Typically the R'Fe$_2$ comprises La 0.5 % by weight, Ce 34.5% by weight, Nd 0.5% by weight, the remainder being Fe.

GB No. 1554384 uses hydride decrepitation to reduce a magnetic alloy to a powder. This phenomenon may also be observed with the above-mentioned hydrogen storage materials. However, the formation of a fine powder upon repeated absorption and desorption of hydrogen is preferably avoided as this would lead to compaction of the powder with the result that its hydrogen absorbing and desorbing properties are impeded. Also the formation of progressively finer particles can eventually lead to loss of material into associated equipment.

Thus, it is highly preferred for the storage material of the present invention to include an unalloyed iron phase. The material usually contains 0.1 to 30% by weight, preferably about 5 to 10% by weight, and most preferably about 5% by weight, of the unalloyed iron phase.

The storage material of the invention preferably has a microstructure comprising 2% to 20% by weight of said eutectic, 0% to 25% by weight of said unalloyed lanthanum phase, 0% to 30% by weight of said unalloyed iron phase, the remainder being said alloy phase, subject to there being a minimum of 40% by weight, most preferably greater than 60% by weight, of said alloy phase.

The storage material most preferably has a microstructure consisting essentially of about 5% by weight of said eutectic, about 5% by weight of said unalloyed lanthanum phase, about 5% by weight of said unalloyed iron phase, and about 85% by weight of said alloy phase.

It has been found that the hydrogen storage capacity of R$_2$Fe$_{17}$ type materials can be substantially improved by performing a heat treatment operation thereon.

Thus, according to another aspect of the present invention, there is provided a method for increasing the hydrogen storage capacity of a material having a microstructure including an alloy phase of the generalised formula R$_2$Fe$_{17}$, wherein R comprises cerium and lanthanum and optionally, at least one other rare earth element, said method comprising heat treating the material in an inert atmosphere so as to homogenise same and to increase the proportion of said alloy phase in the material.

Preferably, the homogenising step is effected to increase the proportion of the alloy phase in the material to at least 40% by weight and most preferably at least 60% by weight.

Preferably, the resultant heat treated storage material is a storage material according to said one aspect of the present invention.

The following method is suitable for the heat treatment of hydrogen storage materials.

The heat treatment may be performed on the material in cast form by allowing the material to cool and preferably solidify, raising the temperature of the material near to its peritectic temperature (of the order of 1068° C. for Ce$_2$Fe$_{17}$), and then allowing it to cool to room temperature.

Alternatively, the cast material may be allowed to cool to room temperature and then raised to within 200° C. of its peritectic temperature and held there for at least 24 hours before cooling to room temperature. More preferably, the cast material is heated to within 100° C., most preferably within 50° C. of its peritectic temperature.

As a further alternative, a hyperstoichiometric (with respect to R) cast material may be held in a two phase (i.e. liquid + R$_2$Fe$_{17}$) state for a predetermined time before being allowed to cool to room temperature. In the case of Ce$_2$Fe$_{17}$, this corresponds to a temperature of 1068 to 932° C.

In one embodiment, drops of the molten material are subjected to very rapid cooling (e.g. splat cooling) so as to produce thin foils having a very fine dendritic structure. With such a process, much smaller diffusion distances are required in the homogenisation process so that the alloy may be homogenised at about 950° C. to produce the required phase structure. In this case, it is preferred to use a material containing a small stoichiometric excess of rare earth elements.

The homogeneity of the material can be improved by ternary additions such as magnesium, titanium, zirconium, chromium, cobalt, nickel, copper, zinc, aluminium, boron and silicon. Aluminium addition also improves the oxidation resistance of the materials. Quaternary and quinternary additions may be made if desired.

The use of a material which is hyperstoichiometric with respect to the R component facilitates homogenisation by annealing within a liquid plus R$_2$Fe$_{17}$ region of the phase diagram and enables the production of a fine eutectic (R'/R'Fe$_2$).

Homogenisation of the alloy is preferably intended to produce a four-phase microstructure containing an R$_2$Fe$_{17}$ phase, an unalloyed lanthanum phase at the grain boundaries, free iron within the grains and a fine R/R'Fe$_2$ eutectic in the intergranular regions, in the proportions as described above to produce hydrogen storage material.

Figure 1:
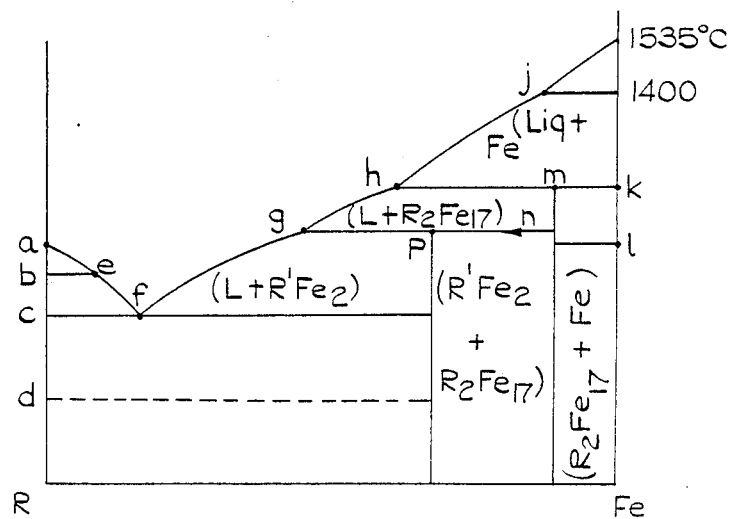
FIG. 1 is a phase diagram and accompanying table for the system R—Fe where R is cerium, praesodymium or neodymium.
Figure 2:
FIG. 2 shows photographically a typical distribution of the phases.

A typical distribution of these phases is shown in FIG. 2 which is a photographic image obtained by Electron Beam Scattering.

The four phases will now be discussed in further detail:

The $R_2Fe_{17}$ phase has, as mentioned above, the function of providing bulk hydrogen storage and the compound has good hydrogen storage capacity. The hydrogen content is controlled by regulating the temperature, and the hydrogen can be effectively locked in the $R_2Fe_{17}$ phase if the alloy is kept at room temperature. At about 150° C., however, rapid hydrogen absorption and desorption can be achieved. It is believed that the room temperature stability is due to the very low hydrogen diffusivity at low temperatures and a high vacuum can be achieved above the hydride providing that it is kept at room temperature.

The unalloyed lanthanum at the grain boundaries affects the particle size which can be obtained. The grain boundary lanthanum can be oxidized if the material, after hydrogenation and before degassing, is exposed to air. This leads to the decrepitation of the material. The size of the resultant powder is controlled by the initial grain size of the alloy and quite coarse particle sizes can be obtained if appreciable grain growth has occurred during the homogenisation process. If the material is exposed to air in the degassed condition, then no oxidation is observed, with the result that the decrepitation process does not take place. This is to be contrasted with the behaviour of $LaNi_5$ and TiFe where a fine powder is always obtained as a result of the hydrogenation process. This fine powder can cause considerable difficulties due to the transport of fine abrasive powder through ancillary piping, and a pressure drop through the material can be caused by compaction of the fine powder.

Figure 3:
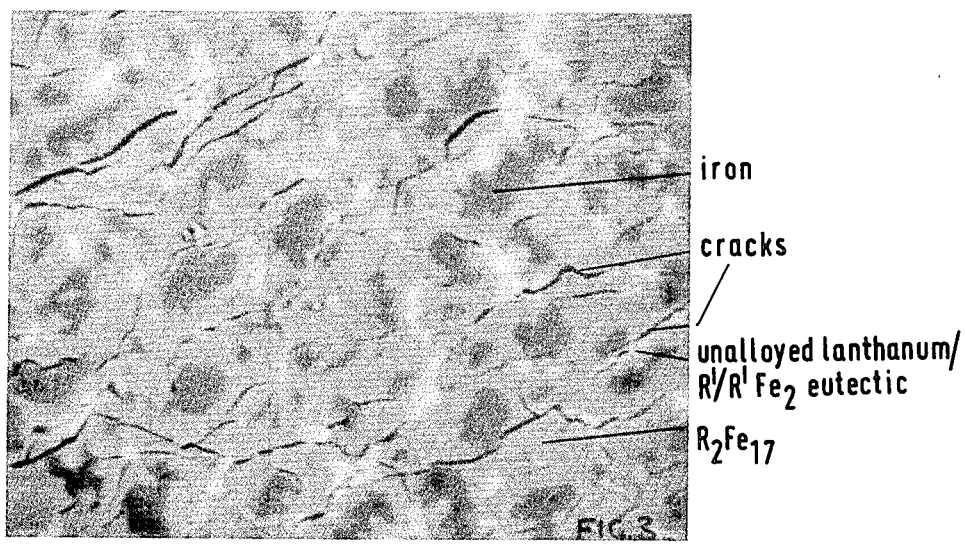
FIG. 3 shows photographically retardation of cracks in the R$_2$Fe$_{17}$ phase.

If the above described oxidation mechanism is not performed, then coarse lumps remain after the hydrogenation process. This is because the free iron, in the form of islands (produced during initial cooling and then partly removed during homogenisation) within the grains, effectively retards the usual cracking process. Thus, cracks in the $R_2Fe_{17}$ phase are arrested by the iron. This is illustrated in FIG. 3. In this condition, the hydrogen storage material is easy to handle and the presence of extensive cracking means that the hydrogen absorption/desorption kinetics are quite acceptable. The coarse material avoids the problem associated with fine powder discussed above.

Thus the unalloyed lanthanum may be present in the material in the form of the metal or in the oxidised form.

The presence of iron also has the function of making the alloy ferromagnetic over a wide temperature range and thus allowing magnetic agitation and trapping of the material by magnetic fields.

Not all of the lanthanum is unalloyed and a small proportion of lanthanum is present in the $R_2Fe_{17}$ lattice and serves the function of expanding the lattice, thus making hydrogen dissolution more favourable and hence improving the storage capacity. Also, and as noted above, a small quantity of lanthanum may be dissolved in the $R'Fe_2$ part of the $R'/R'Fe_2$ eutectic phase.

The invention will now be described in further detail with reference to the accompanying examples.

REFERENCE EXAMPLE

An argon arc-melted material having a manufacturer's quoted composition of 10.5 atomic % mischmetal and 90.5 atomic % iron (25 weight % mischmetal and 75 weight % iron) obtained from Rare Earth Products Limited of Waterloo Road, Widnes, Great Britain was used. The mischmetal in the sample has the following manufacturer's quoted composition in weight %, Ce 50 to 55, La 23 to 27, Nd 10 to 15, Pr 4 to 7, other rare earth elements 1 to 2, Fe less than 1, $SiO_2$ less than 0.1, Ca less than 0.2, C less than 0.01, N less than 0.001, Pb less than 0.025.

The material in its as-cast form was observed to have the approximate phase proportions of 37% by weight free iron, 38% $R_2Fe_{17}$, and 25% by weight lanthanum plus $R'/R'Fe_2$ eutectic.

An analysis of the bulk material showed an average elemental composition as follows:
La: 5.60 wt %
Ce: 16.72 wt %
Pr: 1.35 wt %
Nd: 2.89 wt %
Sm: 2.19 wt %
Fe: 71.24 wt %

This gave a cerium content of 58.2% by weight based on the total weight of cerium, lanthanum and the other rare earths.

In this material, $R_2Fe_{17}$ was constituted by $(La_a Ce_b Pr_c Nd_d Sm_e)_2Fe_x$, wherein a=0.11, b=0.57, c=0.05, d=0.15, e=0.12, and x=12.4, and R' was constituted by $La_f Ce_g Pr_h Nd_i Sm_j$, where f=0.08, g=0.79, h=0.05, i=0.06, j=0.02.

In R, the ratio of lanthanum to other ingredients was 0.124:1. In R', the ratio of lanthanum to other ingredients was 0.08, thus indicating that R' was lanthanum-starved R.

The cast material was cut into cubes having a side length of about 6.4 mm and exposed to hydrogen gas at a pressure of 69,000 kPa at a temperature of 240° C. for 2 hours in an enclosed pressure vessel. The material was then allowed to cool to room temperature before releasing the hydrogen pressure. Examination of the sample at this stage revealed that expansion of the crystal lattice arising from hydrogen absorption had caused the inherently brittle material to crack and break into small particles (size=800 micrometres).

A sample of the thus-produced hydride having a mass of approximately 10g was vacuum degassed by heating to 200° C. in vacuo whilst monitoring the mass by means of a microbalance. Over a period of 65 minutes, a weight loss of 0.52% was recorded, attributable to the gas evolved from the sample which was analysed as hydrogen having a purity of greater than 99.99%. No further weight loss occurred over a period of 4 hours.

EXAMPLE 1

A sample of the material obtained as described in the Reference Example was heat treated in a vacuum furnace for 10 days at a temperature of 1050° C. ( 18° C. less than its peritectic temperature) and subsequently exposed to hydrogen gas at 69,000 kPa at a temperature of 240° C. for 2 hours in an enclosed pressure vessel and allowed to cool to room temperature before releasing the hydrogen pressure.

The material heat treated as described above had its constituent phases present in changed proportions, the constituent phases being 10% by weight free iron, 85% by weight $R_2Fe_{17}$, and 5% by weight lanthanum plus $R'/R'Fe_2$ eutectic.

At the end of the hydrogenation the sample was observed to have crumbled to smaller particles than the sample treated in accordance with the Reference Example. The particle size of the material was of the order of 100 micrometres.

When a sample of the material treated as described above was vacuum degassed in a similar manner to that described in the Reference Example, it was found to have absorbed 0.8% by weight of hydrogen during the absorption stage. Thus, it is clear by comparison with the Reference Example that the heat treatment step materially improved the hydrogen absorption capacity of the material.

EXAMPLE 2

A further heat treated sample was prepared as described in Example 1 and subsequently exposed to hydrogen gas for 48 hours at a pressure of 3795 kPa at room temperature, having first being ground to a powder having a particle size of approximately 5 micrometres.

The relative phase proportions of this material were observed to be 10% by weight free iron, 85% by weight $R_2Fe_{17}$, and 5% by weight lanthanum plus $R'/R'Fe_2$ eutectic.

Upon vacuum degassing in a similar manner to that described in Reference Example, the sample was found to have absorbed 0.6% by weight of hydrogen gas during the absorption phase. It will thus be appreciated that even at low temperature and pressure, a greater proportion of hydrogen was absorbed with the heat treated material, than with the unheat-treated sample of the Reference Example.

EXAMPLE 3

A sample of argon arc melted material was employed having the following composition:

12.2% by weight La, 10.9% by weight Ce, 4.2% by weight Pr, 7.7% by weight Nd and 65.0% by weight Fe. (Cerium content = 31% by weight based on the total weight of cerium, lanthanum and the other rare earth elements).

The material was found to have relative phase proportions of 23% by weight free iron, 42% by weight $R_2Fe_{17}$, and 35% by weight lanthanum plus $R'/R'Fe_2$ eutectic. In this material, $R_2Fe_{17}$ was constituted by $(La_aCe_bPr_cNd_d)_2 Fe_x$, wherein $a=0.18$, $b=0.43$, $c=0.12$, $d=0.26$ and $x=14.5$, and the composition of R' exhibited a lanthanum-starvation compared with R.

The sample was obtained as described in the Reference Example and was exposed to hydrogen gas at a pressure of 3450 kPa and at a temperature of 250° C., and was allowed to cool to room temperature before release of the applied pressure. Upon vacuum degassing the hydrogenated material at 200° C., the weight of hydrogen gas released was measured as 1.18% by weight of the material.

EXAMPLE 4

Example 3 was repeated with the exception that after it had been cut into cubes and before hydrogenation, it was heat treated in a vacuum furnace for 14 days at 1,000° C. (of the order of 68° C. below its peritectic temperature). The material was found to have relative phase proportions of not greater than 5% by weight free iron, 70% by weight $R_2Fe_{17}$, and the balance (approximately 25% by weight) being lanthanum plus $R'/R'Fe_2$ eutectic.

Upon vacuum degassing the hydrogenated material at 200° C., the weight of hydrogen gas released was measured as 1.40% by weight of the material. This example demonstrates that heat treatment of the material improves the already good hydrogen absorption capacity of the material of Example 3.

EXAMPLE 5

A sample of material obtained as described in the Reference Example but having the proportions of cerium and lanthanum reversed (giving a cerium content of 19.5% by weight based on the total weight of cerium, lanthanum and other rare earths) was subsequently heat treated and hydrogenated as described in Example 1.

This sample was exposed to atmosphere after hydrogenation and cooling. Over a period of several hours, the material was observed to grow warm and gradually crumble to a fine powder having a particle size of the order of 20 micrometres with an associated weight gain of 3.5% in a manner characteristic with an oxidation process.

Upon vacuum degassing this material at 200° C., the weight of hydrogen gas released was measured as 1.16% by weight of the material. The oxidized material had a hydride which was stable in air but which, nevertheless, had a good hydrogen storage capacity.

EXAMPLE 6

A sample of material was obtained as described in the Reference Example having a chemical composition of $Ce_2Fe_{17}$, i.e. the component R consisted solely of cerium.

This material was exposed to hydrogen gas as described in the Reference Example, but for an extended period of 72 hours.

A sample of this material was vacuum degassed at 250° C. for 48 hours. By monitoring the weight loss of the material, it was found that it had absorbed 0.38% by weight of hydrogen during the hydrogenation stage. This Example demonstrates that it is essential, to be a useful hydrogen storage material, to have a multi-component lanthanum-containing rare earth system for R.

EXAMPLE 7

Figure 4:
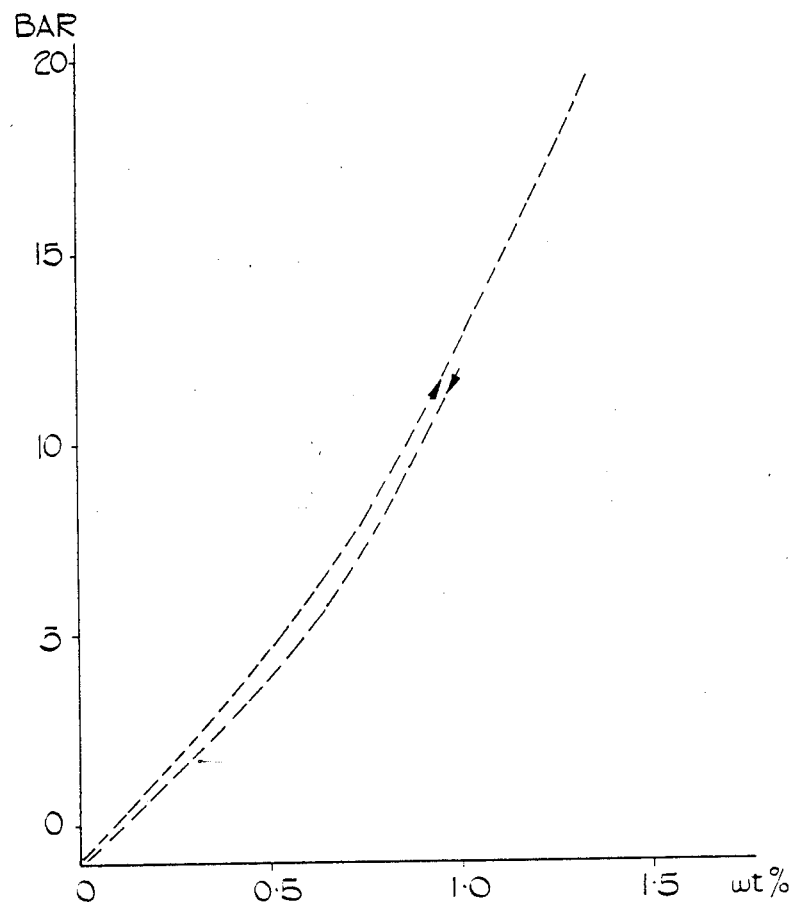
FIG. 4 graphically shows the uptake of hydrogen in the material on exposure to increasing and decreasing pressures of hydrogen.

Samples of the material produced in Example 4 were exposed to increasing hydrogen pressures at 135° C. and the uptake of hydrogen by the material was measured by the volumetric method. The results of this exposure are expressed on the graph in FIG. 4 which shows the amount of hydrogen present in weight % in the material at a given hydrogen pressure in bar above atmospheric pressure) at 135° C. The lines represent the results obtained after initial exposure to an increasing pressure of hydrogen followed by a decreasing pressure of hydrogen, a repeat of this treatment, a further increase and decrease of hydrogen pressure after cooling in 10 bar of hydrogen and repeating the hydrogen pressure cycling as before.

We claim:

1. A hydrogen storage material for releasably storing hydrogen having a microstructure comprising an alloy phase of the general formula $R_2Fe_{17}$, wherein R comprises cerium and lanthanum and, optionally, at least one other rare earth element, and wherein a microstructure also contains from about 2 to 35% by weight based on the total weight of all phases a eutectic of the formula $R'/R'Fe_2$, wherein $R'$ is lanthanum-starved R; wherein said alloy phase of the generalised formula $R_2Fe_{17}$ is present in an amount of not less than 40% by weight of the material, and said material contains less than 60% by weight of cerium based on the total amount of cerium, lanthanum and, if present, said at least one other rare earth element.

2. A material as claimed in claim 1, wherein R' contains no lanthanum.

3. A material as claimed in claim 1, wherein the weight ratio of lanthanum to cerium in the material is at least 0.4:1.

4. A material as claimed in claim 3, wherein the weight ratio of lanthanum to cerium is at least 1:1.

5. A material as claimed in claim 4, wherein the weight ratio of lanthanum to cerium in the material is about 2:1.

6. A material for releasably storing hydrogen having a microstructure comprising an alloy phase of the general formula $R_2Fe_{17}$, wherein R comprises cerium and lanthanum and, optionally, at least one other rare earth element, and wherein a microstructure also contains a eutectic of the formula $R'/R'Fe_2$, wherein R' is lanthanum-starved R; wherein said alloy phase of the generalized formula $R_2Fe_{17}$ is present in an amount of not less than 40% by weight of the material, and said material contains less than 60% by weight of cerium based on the total amount of cerium, lanthanum and, if present, said at least one other rare earth element, said eutectic being present in an amount of not more than 20% by weight, based on the total weight of all phases.

7. A material as claimed in claim 6, wherein the eutectic is present in an amount of not more than 15% by weight, based on the total weight of all phases.

8. A material as claimed in claim 7, wherein the eutectic is present in an amount of about 5% by weight, based on the total weight of all phases.

9. A material as claimed in claim 1, wherein said at least one other rare earth element is present and includes praesodymium and/or neodymium.

10. A material as claimed in claim 1, wherein said at least one other rare earth element is present in an atomic percentage which is less than or equal to the atomic percentage of lanthanum in the material.

11. A material as claimed in claim 9 or 10, wherein the combined amount of cerium and lanthanum is greater than 50% by weight of the total amount of cerium, lanthanum and said at least one other rare earth element.

12. A material as claimed in claim 1, wherein the cerium content of the total amount of cerium, lanthanum and, if present, said other rare earth element in said material is less than 30% by weight.

13. A material as claimed in claim 1, wherein said material is mischmetal based.

14. A material for releasably storing hydrogen having a microstructure comprising on alloy phase of the general formula $R_2Fe_{17}$, wherein R comprises cerium and lanthanum and, optionally, at least one other rare earth element, and wherein a microstructure also contains a eutectic of the formula $R'/R'Fe_2$; wherein R' is lanthanum-starved R; wherein said alloy phase of the generalized formula $R_2Fe_{17}$ is present in an amount of not less than 40% by weight of the material, and said material contains less than 60% by weight of cerium based on the total amount of cerium, lanthanum and, if present, said at least one other rare earth element, said material containing from about 0.1–25% by weight lanthanum as an allowed lanthanum phase.

15. A material as claimed in claim 14, which further contains 0.1–30% by weight of iron as an unalloyed iron phase.

16. A material as claimed in claim 15, wherein said material contains not more than 10% by weight of unalloyed iron.

17. A material as claimed in claim 16, containing about 5% by weight of unalloyed iron.

18. A material for releasably storing hydrogen having a microstructure comprising an alloy phase of the general formula $R_2Fe_{17}$, wherein R comprises cerium and lanthanum and, optionally, at least one other rare earth element, and wherein a microstructure also contains a eutectic of the formula $R'R'Fe_2$, wherein R' is lanthanum-starved R; wherein said alloy phase of the generalized formula $R_2Fe_{17}$ is present in an amount of not less than 40% by weight of the material, and said material contains less than 60% by weight of cerium based on the total amount of cerium, lanthanum and, if present, said at least one other rare earth element, said material having a microstructure comprising 2% to 20% by weight of said eutectic, 0.1% to 25% by weight of an unalloyed lanthanum phase, 0.1% to 30% by weight of an unalloyed iron phase, the remainder being said alloy phase.

19. A material as claimed in claim 1, wherein R in the generalised formula $R_2Fe_{17}$ consists essentially of $La_a Ce_b Pr_c Nd_d$, wherein $a+b+c+d=1.0$, a is 0.3, b is 0.05 to 0.6, c is 0.02 to 0.2 and d is 0.02 to 0.65.

* * * * *